(12) United States Patent
Chiang

(10) Patent No.: US 8,402,427 B2
(45) Date of Patent: Mar. 19, 2013

(54) WEB APPLICATION GENERATOR

(75) Inventor: Hiang-Swee Chiang, Elmhurst, NY (US)

(73) Assignee: Gutenberg Printing LLC, Los Altos, CA (US)

( * ) Notice: Subject to any disclaimer, the term of this patent is extended or adjusted under 35 U.S.C. 154(b) by 1938 days.

(21) Appl. No.: 11/512,978

(22) Filed: Aug. 29, 2006

(65) Prior Publication Data

US 2006/0294500 A1 Dec. 28, 2006

Related U.S. Application Data

(63) Continuation of application No. 09/810,716, filed on Mar. 16, 2001.

(60) Provisional application No. 60/190,364, filed on Mar. 17, 2000.

(51) Int. Cl.
G06F 9/44 (2006.01)
G06F 3/00 (2006.01)
G06F 9/46 (2006.01)
G06F 13/00 (2006.01)

(52) U.S. Cl. ......... 717/106; 717/117; 717/143; 717/108

(58) Field of Classification Search .................. None
See application file for complete search history.

(56) References Cited

U.S. PATENT DOCUMENTS

| | | | |
|---|---|---|---|
| 5,327,529 A | 7/1994 | Fults et al. | 345/762 |
| 5,428,782 A | 6/1995 | White | |
| 5,768,510 A | 6/1998 | Gish | 395/200.33 |
| 5,848,274 A | 12/1998 | Hamby et al. | |
| 5,854,932 A | 12/1998 | Mariani et al. | |
| 5,901,313 A | 5/1999 | Wolf et al. | 719/328 |
| 5,905,895 A | 5/1999 | Halter | 395/709 |
| 5,940,075 A | 8/1999 | Mutscheler et al. | 715/760 |
| 5,940,834 A | 8/1999 | Pinard et al. | 707/102 |
| 5,953,523 A | 9/1999 | Martinez et al. | 395/701 |
| 5,953,524 A | 9/1999 | Meng et al. | 717/108 |
| 5,953,526 A | 9/1999 | Day et al. | 395/701 |
| 5,953,731 A | 9/1999 | Glaser | 707/513 |
| 5,956,736 A | 9/1999 | Hanson et al. | 707/513 |
| 5,978,585 A * | 11/1999 | Crelier | 717/145 |
| 5,987,247 A * | 11/1999 | Lau | 717/100 |
| 5,995,756 A | 11/1999 | Herrmann | 395/712 |
| 5,999,179 A | 12/1999 | Kekic et al. | 345/349 |
| 5,999,944 A | 12/1999 | Lipkin | 707/104 |
| 6,005,568 A | 12/1999 | Simonoff et al. | 345/335 |

(Continued)

FOREIGN PATENT DOCUMENTS

WO   WO 98/21679   5/1998

OTHER PUBLICATIONS

Paine, Jocelyn; "Web-O-Matic/Rexx: A tool for writing interactive Web pages that works by compiling HTML into Object Rexx"; Apr. 1997.

(Continued)

*Primary Examiner* — Lewis A Bullock, Jr.
*Assistant Examiner* — Mark Gooray
(74) *Attorney, Agent, or Firm* — Stolowitz Ford Cowger LLP

(57) ABSTRACT

A method, system and apparatus for providing a web application or to generate the basis for a complete web application source code. Based on user interface input files provided by graphic designers, the web application or generates application framework code, an event handler skeleton and s logic foundation code. Web developers then prepare additional source code object-oriented programming language based on the event handler skeleton and business logic foundation code to create web application business logic objects and handler methods. Ultimately the graphical user interface input files prepared by the designers and web application source code prepared by the web developers dynamically bound at runtime.

30 Claims, 10 Drawing Sheets

U.S. PATENT DOCUMENTS

| | | | | |
|---|---|---|---|---|
| 6,006,242 | A | 12/1999 | Poole et al. | 707/531 |
| 6,012,098 | A | 1/2000 | Bayeh et al. | 709/246 |
| 6,023,271 | A | 2/2000 | Quaeler-Bock et al. | 715/866 |
| 6,023,715 | A | 2/2000 | Burkes et al. | 707/514 |
| 6,029,141 | A | 2/2000 | Bezos et al. | 705/27 |
| 6,035,119 | A | 3/2000 | Massena et al. | 395/701 |
| 6,035,330 | A | 3/2000 | Astiz et al. | 709/218 |
| 6,076,108 | A | 6/2000 | Courts et al. | 709/227 |
| 6,085,220 | A * | 7/2000 | Courts et al. | 709/201 |
| 6,188,399 | B1 | 2/2001 | Voas et al. | 345/723 |
| 6,285,989 | B1 | 9/2001 | Shoham | |
| 6,337,696 | B1 * | 1/2002 | Lindhorst et al. | 715/763 |
| 6,509,913 | B2 | 1/2003 | Martin et al. | 345/762 |
| 6,601,233 | B1 | 7/2003 | Underwood | 717/102 |
| 6,697,824 | B1 | 2/2004 | Bowman-Amuah | 709/229 |
| 6,792,607 | B1 | 9/2004 | Burd et al. | 719/316 |
| 6,950,831 | B2 | 9/2005 | Haley | 707/104.1 |
| 7,140,001 | B1 * | 11/2006 | Natori et al. | 717/105 |

OTHER PUBLICATIONS

Ceri et al., "Design principles for data-intensive Web sites", Mar. 1999, ACM SIGMOD, vol. 28 issue 1.

Aviram, M.H., "XML and Java: A powerful combination; Why JavaOne's session on 'XML in the Java Platform' drew the crowds," *JavaWorld*, 1999.

Berst, J., "Java Authoring Tools Could Kill HTML," *ZDNet Anchor Desk*, 1997.

Boggan, S., "Getting Started with Microsoft HTML Help Workshop," *PC Magazine*, 1999.

Buchner, M., "Serving Up Java Pages," *MIDRANGE Systems*, 1999.

Burton, J., "Java Tools Get Visual; Microsoft's Visual J++ 6.0 and Symantec's Visual Café 2.5 for Java Database Development Edition," *PC Computing*, 1998.

Gonsalves, A., "Lutris' server divides duties; Lutris Technologies Enhydra 2.1 Web server," *PC Week*, Jul. 12, 1999.

Jilg, J. et al., "Java Servlets: Advantages and Deployment," *e-Business Advisor*, 1998.

"Pack your Pages with Java," *RandomNoise Coda*.

Patel, J. et al., "Make the Web Work for You—Doculabs tests nine Web application development tools to see which one is best for your business," *Information Week*, 1998.

PCT International Search Report (May 8, 2001).

PCT Written Opinion from corresponding PCT Application No. PCT/US01/08699.

"RandomNoise Coda's Java frees you from HTML," *RandomNoise Coda*.

"Spilling the Beans on Java Applications Servers," NetworkComputing.com, Nov. 1, 1999.

Stolowitz Ford Cowger, Listing of Related Cases, Dec. 28, 2011.

Valesky, T., "Simplify Web Development with Java Server Pages," *e-Business Advisor*, 1999.

\* cited by examiner

800

900

1000

WEB APPLICATION GENERATOR

CROSS-REFERENCE TO RELATED APPLICATIONS

This application is a continuation of U.S. application Ser. No. 09/810,716, filed Mar. 16, 2001, entitled "WEB APPLICATION GENERATOR," now pending, which claims benefit of U.S. Provisional Patent Application No. 60/190,364, filed on Mar. 17, 2000, entitled HTML TO WEB APPLICATION GENERATOR the entirety of which is incorporated by reference herein.

FIELD OF THE INVENTION

A method, system and apparatus for generating web application source code, and, more specifically, a method, system and apparatus that reads a set of graphical web application screens as an input and generates the basis for a complete web application source code as the output.

BACKGROUND OF THE INVENTION

The increasing popularity of the World Wide Web and other Internet-based applications has encouraged many software companies and corporations to allocate major resources towards web-enabling existing or new applications. For example, most retail applications conducted solely by phone or face-to-face in the past are now also conducted electronically over the World Wide Web.

Several approaches are used by web application developers to develop web applications. Each web application generally consists of the application framework, the application graphical user interface (GUI), application event handler(s) and the application business logic. A first approach initiates with graphic designers and/or business analysts specifying web application screens in Hypertext Markup Language (HTML) format using visual HTML editors such as Microsoft FrontPage, Netscape Composer and Adobe GoLive. The resulting HTML files are then given to web developers who specialize in computer programming. The web developers choose a traditional programming language such as C, C*+, or Perl, prepare the programming source code files and embed the HTML tags from the HTML files provided by the graphic designers/business analysts directly into the web application programming source code. The web developers must also write the application framework and event handler code. All application source code files are then compiled into executable objects that are later installed within a web application server for access by web browsers.

However, after the web developers embed the HTML tags into the application source code, it is difficult for the graphic designers/business analysts to visualize how the web application screens appear by analyzing the HTML tags intermixed with the programming language code. As a result, modifying or changing the graphical user interface is difficult after the initial development. Further, each graphical user interface modification requires the web developers to re-compile the application source code and reinstall the object code within the web application server. Finally, the web developers must manually write the application framework and event handler code, which is a complex task and often introduces errors into the web application.

A second approach also initiates with graphic designers and/or business analysts specifying web application screens in HTML format using a visual HTML editor. The resulting HTML files are then given to web developers who specialize in computer programming. However, instead of using a traditional programming language such as C, C++ or Perl to write the web application, the web developers write scripting language code such as JavaScript, VBScript, PHP Hypertext Preprocesor (PHP) or ColdFusion directly into the HTML files. All application code files are later interpreted at runtime based on a web request.

However, because of the scripting nature of the programming language, it is difficult for web developers to write structural or object-oriented code. Also, the final application source code includes many different HTML files whose structure and naming system do not reflect the purpose of the code residing inside them. Further, it is difficult for web developers to add functionality using this approach. Finally, since most scripting languages are interpreted at runtime based on a web request, the runtime performance of the web application is much slower than for a compiled web application.

A third approach, the Enhydra XMLC compiler introduced by Lutris Technologies, initiates with graphic designers and/or business analysts specifying web application screens in either HTML, Website Markup Language (WML) or Extensible Markup Language (XML) format. The resulting files are then converted by the XMLC compiler into a Java class containing an industry standard Document Object Model (DOM) tree. This DOM tree is a collection of Java objects that allows web developers to remove, update or add new content to the DOM tree. Also, this conversion separates the input files into an XML class that the graphic designers/business analysts can manipulate, separate from the web developers preparing the application framework and business logic. Thus, graphic designers/business analysts can view and test the application screens as a standalone component, while web developers prepare the application source code.

However, the Enhydra XMLC compiler does not generate application framework code or event handler code, nor does it generate any type of skeleton for the application framework or event handler methods to assist the web developers. In fact, the DOM object tree requires further manipulation by the web developers, including setting all attributes, to convert the DOM object tree into a "string" which is readable by a web browser within the Transmission Control Protocol/Internet Protocol (TCP/IP). Thus, the Enhydra XMLC Compiler approach relies on the web developers to write the application framework code, event handler code, and develop the code for displaying outputs using the generated DOM object tree. Further, after the initial files created by the graphic designers/business analysts are compiled by the XMLC compiler, any changes to the web application screens by the graphic designers/business analysts must be manually re-compiled by the web developers before the web application is available based on a web browser request.

SUMMARY OF THE INVENTION

The above identified problems are solved and a technical advance is achieved by the web application generator. In accordance with one embodiment of the web application generator, there is provided a method of generating computer code for a web application, and dynamically binding input files from graphic designers and source code from web developers, comprising the web application server receiving input files from graphic designers or business analysts, wherein the input files are at least one web application graphical user interface. The web application server determines if an application framework code is available for the web application, and retrieves the application framework code from an application directory. If the application framework code is not available for the web application, then the web application server generates the application framework code, along with a business logic foundation code, an event handler skeleton and a graphical user interface code. Further, based oh work by web developers, the web application server receives web application business logic objects and event handlers from the web developers, and organizes the application framework code, web application business logic objects and event handler methods into web application source code. The method further comprises compiling the web application source code. Modified input files may then be received by the web application server from the graphic designers or business analysts, and the modified input files are compiled and dynamically bound with the compiled web application source code at runtime. Generating the event handler skeleton comprises parsing the input files, reviewing each parsed input file for a tag type, attribute name and attribute value, and determining an event handler method based on the tag type, attribute name and attribute value.

An advantage of the web application generator is that the graphic designers can modify the web application graphical user interface at the same time that the web developers are preparing the web application business logic objects and event handler methods. Also, modifications to the input files that make up the graphical user interface are automatically re-compiled or re-interpreted at runtime without affecting the parallel work of the web developers. Further, the event handler skeleton, business logic foundation code and graphical user interface code provide web developers with a framework for finalizing the web application source code.

It is not intended that the method, system and apparatus for providing a web application generator be summarized here in its entirety. Rather, further features, aspects and advantages of the web application generator are set forth in or are apparent from the following drawings, detailed description and claims which follow.

BRIEF DESCRIPTION OF THE DRAWINGS

Further aspects of the method, system and apparatus for providing a web application generator will be more readily appreciated upon review of the detailed description set forth below when taken in conjunction with the accompanying drawings, of which.

It will be understood that the foregoing brief description and the following detailed description are exemplary and explanatory of the method, system and apparatus for providing a web application generator, but are not intended to be restrictive thereof or limiting of the advantages which can be achieved by the web application generator. Thus, the accompanying drawings, referred to herein and constituting a part hereof, illustrate embodiments of the web application generator and, together with the detailed description, serve to explain the principles of the web application generator.

DETAILED DESCRIPTION OF ILLUSTRATIVE EMBODIMENTS

Figure 1:
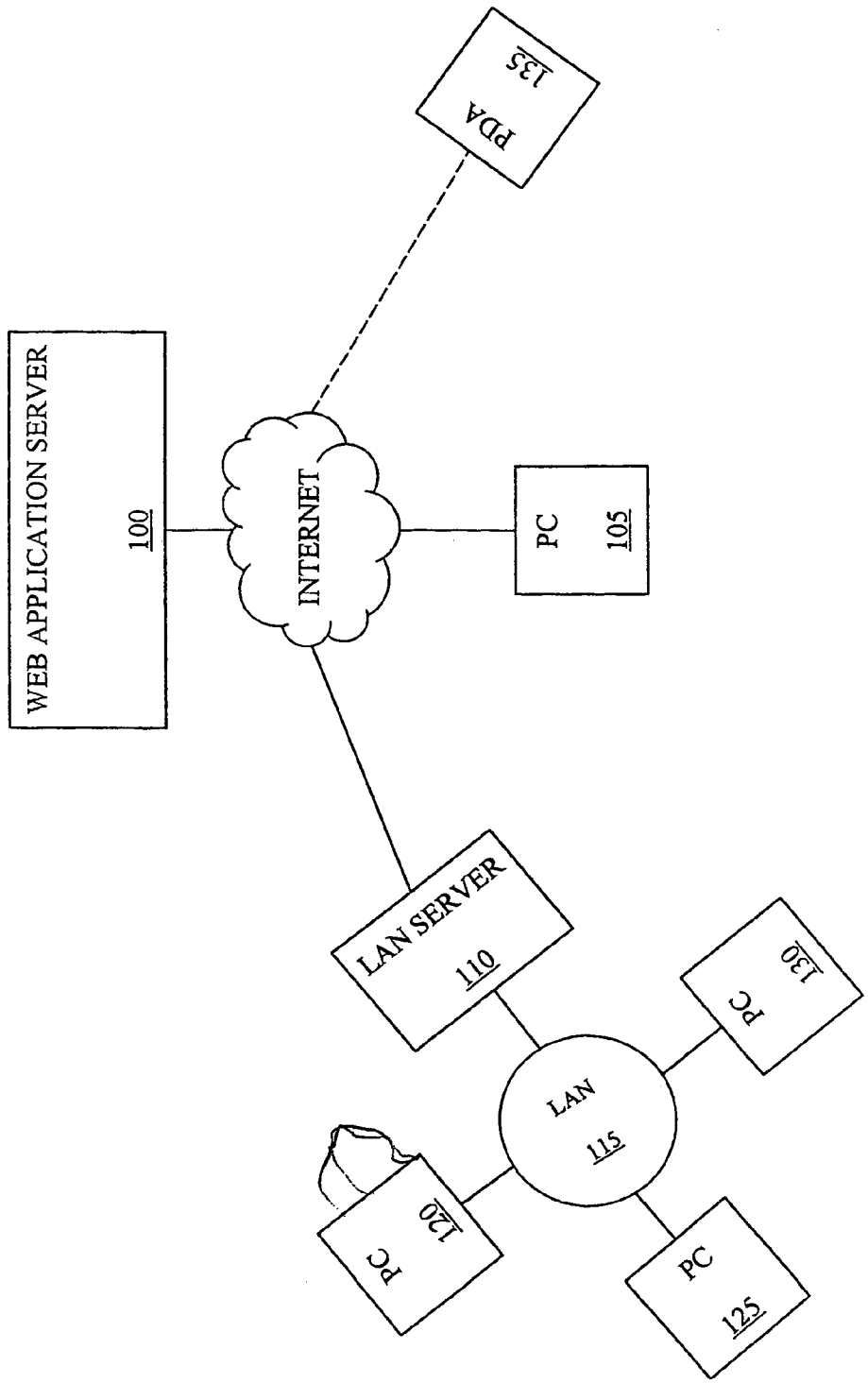
FIG. 1 is a network schematic of an embodiment of the web application generator system by which web applications are accessed.

The web application generator system is illustrated generally in FIG. 1. First, users may request and access web applications in a variety of ways. For example, a user may access the Internet with a personal computer (PC) 105. The PC 105 usually contains web browser software, such as Microsoft Internet Explorer or Netscape Navigator. The user provides a uniform resource locator (URL) address using the web browser, which accesses the Internet in hypertext transfer protocol (HTTP) format to contact the application server 100 identified by the URL address. Based on the particular URL address, the application server 100 prepares the appropriate files and delivers them to the requesting web browser by means of the Internet. A user may also access the Internet with a PC which is part of a local area network (LAN). The user's PC in a LAN, such as PC 120, accesses a web application in the same manner as PC 105, except that the URL address request and response must additionally travel within the LAN 115 and through the LAN server 110 prior to reaching the Internet. Finally, a user may access a web application with a wireless device, such as a personal digital assistant (PDA) 135 or a cellular phone. For example, the PDA 135 contains web browser software that accepts a URL address input from the user, and accesses the Internet in a wireless fashion. Based on the URL address, the request is sent to the appropriate application server, where the web application requested is prepared and sent back to the requesting PDA. Thus, the web application may be requested in any technologically feasible fashion, including in a wireless fashion.

Figure 2:
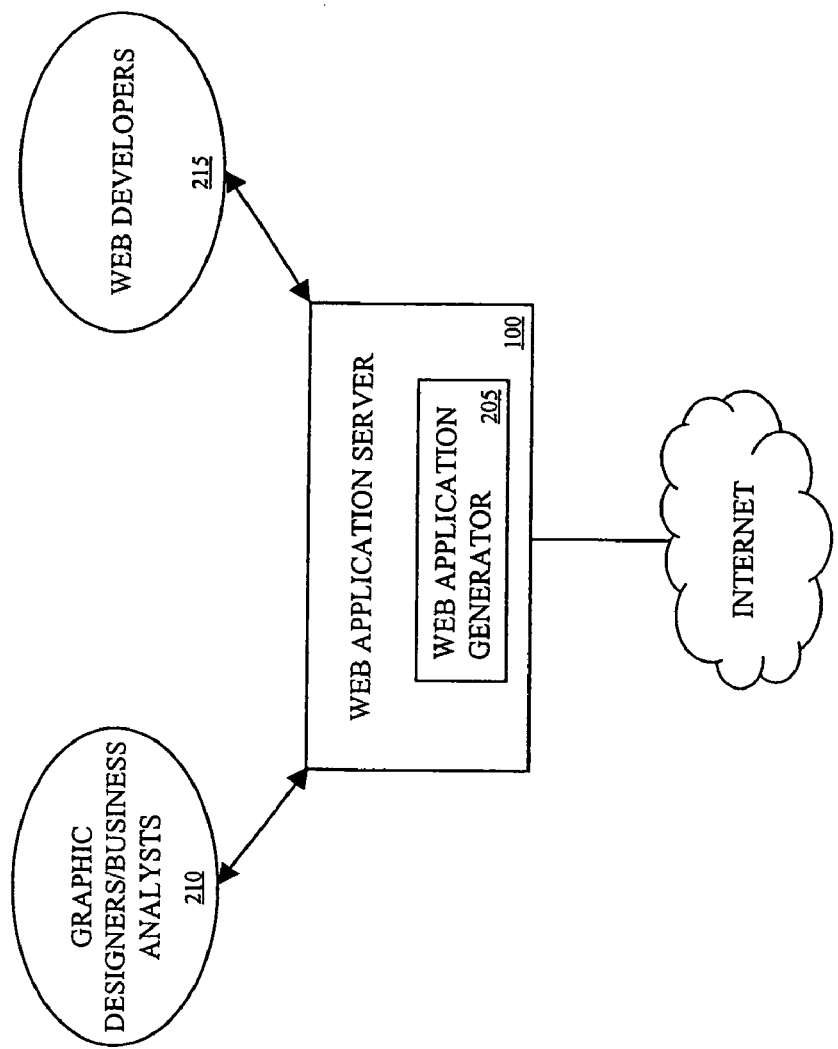
FIG. 2 is a network schematic of an embodiment of the web application generator system by which web applications are generated.

The web application generator/web application server is illustrated generally in FIG. 2. The web application server 100 comprises a web application generator 205. Web applications are generally prepared by graphic designers/business analysts 210 and web developers 215. In one embodiment, the graphic designers/business analysts 210, on the one hand, create the web application screens (graphical user interface) in one of several available formats, such as XML and XSL (Extensible Style Language), HTML, cHTML (compact Hypertext Markup Language) and WML.

The choice of web application screen format depends on the types of devices targeted by the graphic designers/business analysts 210 and web developers 215 for accessing the web application being developed. For example, for web browser access only, the web application screen format can be HTML. For wireless application protocol (WAP) phone access only, the web application screen format can be WML. For i-mode phone access only, the web application screen format can be cHTML. Finally, for browser, WAP phone, i-mode phone and other device access, the web application screen format can be XML and XSL, particularly because XML is a "meta" language which is used to create other languages such as HTML, WML and cHTML. (XSL defines the standard stylesheet language for XML).

The web developers 215 are typically computer programmers who use a programming language, such as the Java language developed by Sun Microsystems, to write the underlying function for the web application.

Figure 3:
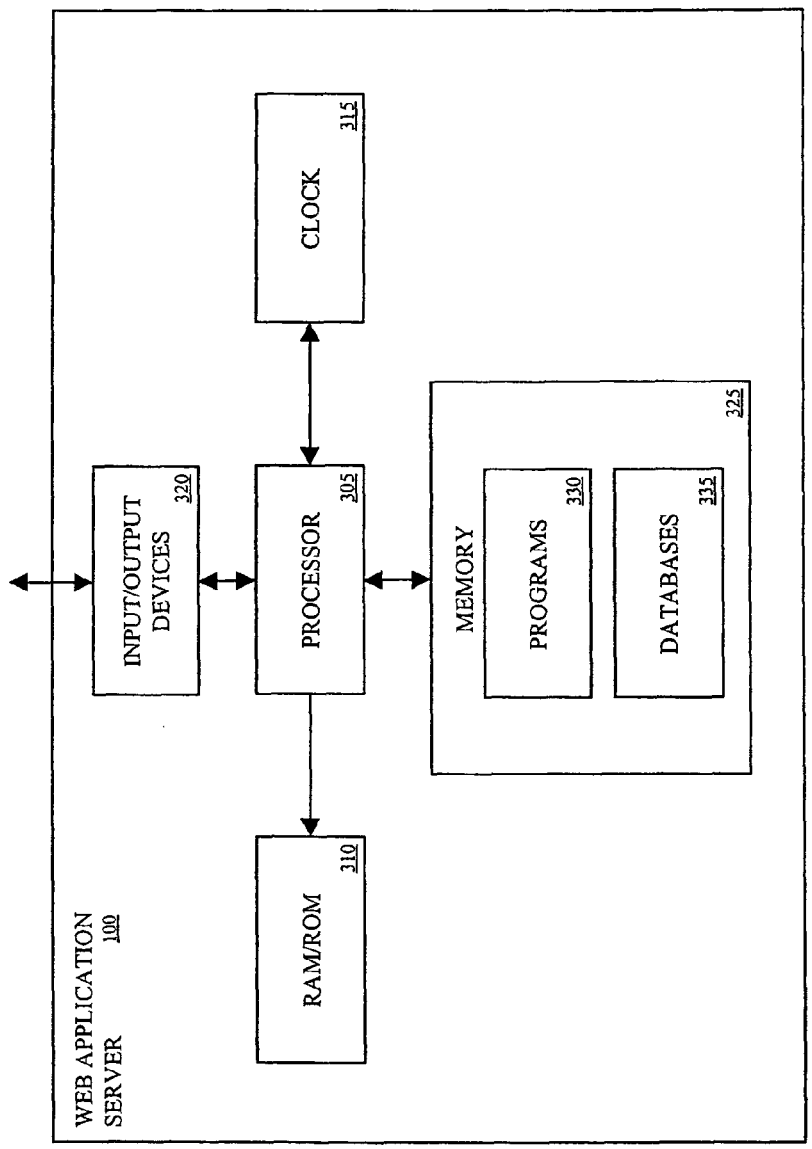
FIG. 3 is a block diagram of an embodiment of the web application server 100.

Exemplary components of the web application server 100 are illustrated in FIG. 3. The primary component of web application server 100 is processor 305, which may be any commonly available microprocessor. Processor 305 may be operatively connected to further exemplary components, such as RAM/ROM 310, clock 315, input/output devices 320 and memory 325 which, in turn, stores one or more computer programs 330 and databases 335.

Processor 305 operates in conjunction with random-access memory and read-only memory. The random-access memory (RAM) portion of RAM/ROM 310 may be a suitable number of Single In-Line Memory Module (SIMM) chips having a storage capacity (typically measured in kilobytes or megabytes) sufficient to store and transfer processing instructions utilized by processor 305 which may be received by application programs 330. The read-only memory (ROM) portion of RAM/ROM 310 may be any permanent non-rewritable memory medium capable of storing and transferring processing instructions performed by processor 305 during a start-up routine of web application server 100.

Clock 315 may be an on-board component of processor 305 which dictates a clock speed (typically measured in MHz) at which processor 305 performs and synchronizes communication between the internal components of web application server 100.

Input/output devices 320 may be one or more known devices used for receiving operator inputs, network data, and the like and transmitting outputs resulting therefrom. Accordingly, exemplary input devices may include a keyboard, a mouse, a voice recognition unit and the like for receiving operator inputs. Output devices may include any known devices used to transmit data, including transmitting data over the Internet. Other input/output devices may include a telephone or network connection device, such as a telephone modem, a cable modem, a T-1 connection, a digital subscriber line or a network card, for communicating data to and from other computer devices over the Internet.

Memory 325 may be an internal or external large capacity device for storing computer processing instructions, computer-readable data, and the like. The storage capacity of memory 325 is typically measured in megabytes or gigabytes. Accordingly, memory 325 may be one or more of the following: a floppy disk in conjunction with a floppy disk drive, a hard disk drive, a CD-ROM disk and reader/writer, a DVD disk and reader/writer, a ZIP disk and a ZIP drive, and/or any other computer readable medium that may be encoded with processing instructions in a read-only or read-write format.

Memory 325 may store a plurality of programs 330. Programs 330 may include web application generator 205. Memory 325 also includes databases 335 comprising multiple blocks of information relevant to the web application.

Figure 4:
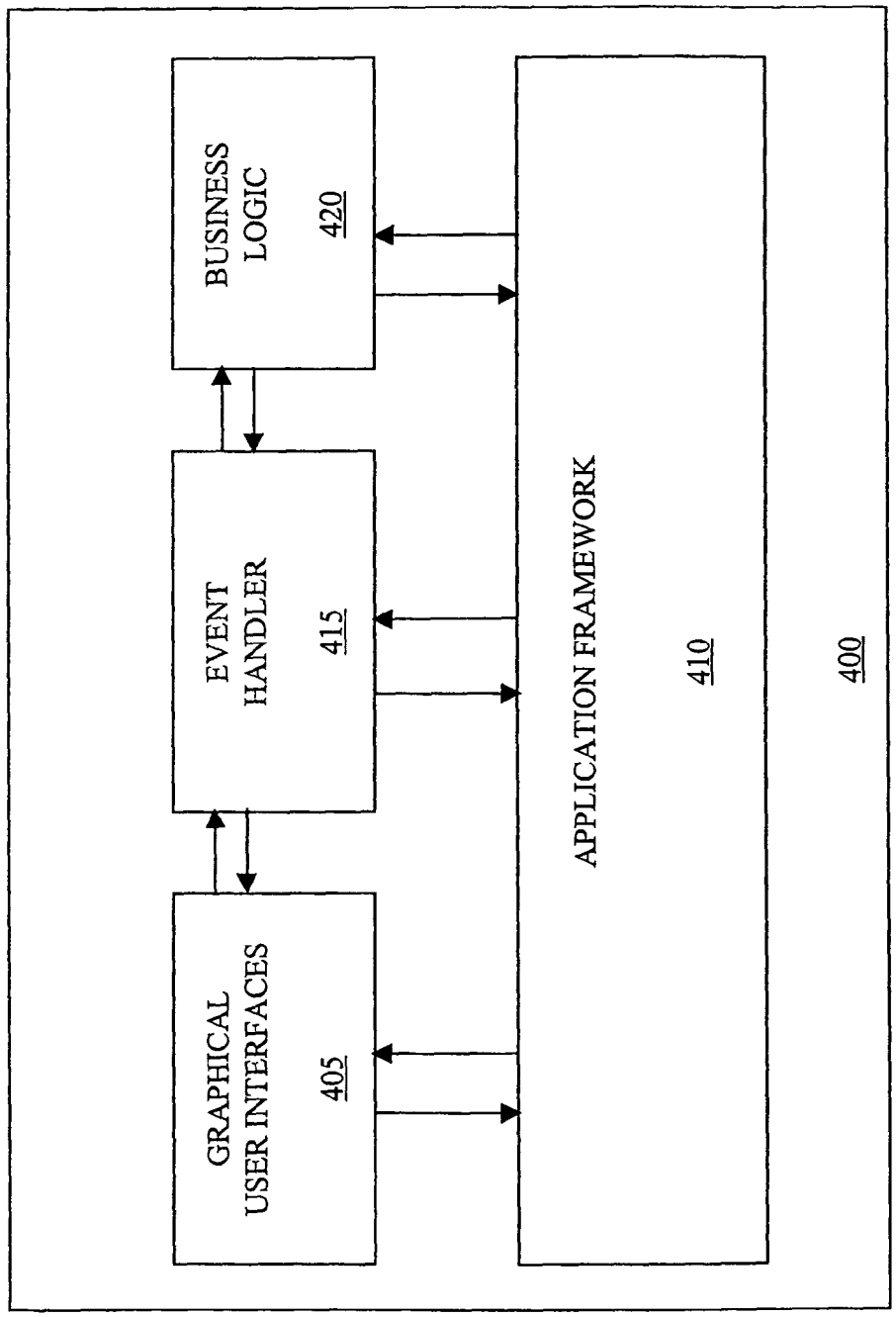
FIG. 4 is a block diagram of an embodiment illustrating the components of a web application 400.

A web application 400, illustrated generally in FIG. 4, comprises application graphical user interfaces (GUI) 405 (prepared by the graphic designers/business analysts 210), application framework 410, application event handler 415 and application business logic 420. Application framework 410 provides instruction to the operating system of the web application server 100, and determines/coordinates the execution of each function performed by the web application. The application framework 410 also acts as a conduit between the web browser request (in the form of a URL address) and the interaction of the graphics (prepared by the graphic designers/business analysts 210) and function (written by the web developers 215). The application event handler 415 is equivalent to a "click method" object in an object-oriented programming language for handling requests based on the GUI <input> tags. The application event handler 415 coordinates between the application framework 410 and the application business logic 420. The application business logic 420 controls the function portion of the web application. Also, the application business logic 420 is generally invoked by the application event handler 415.

Web Application Development

Figure 5:
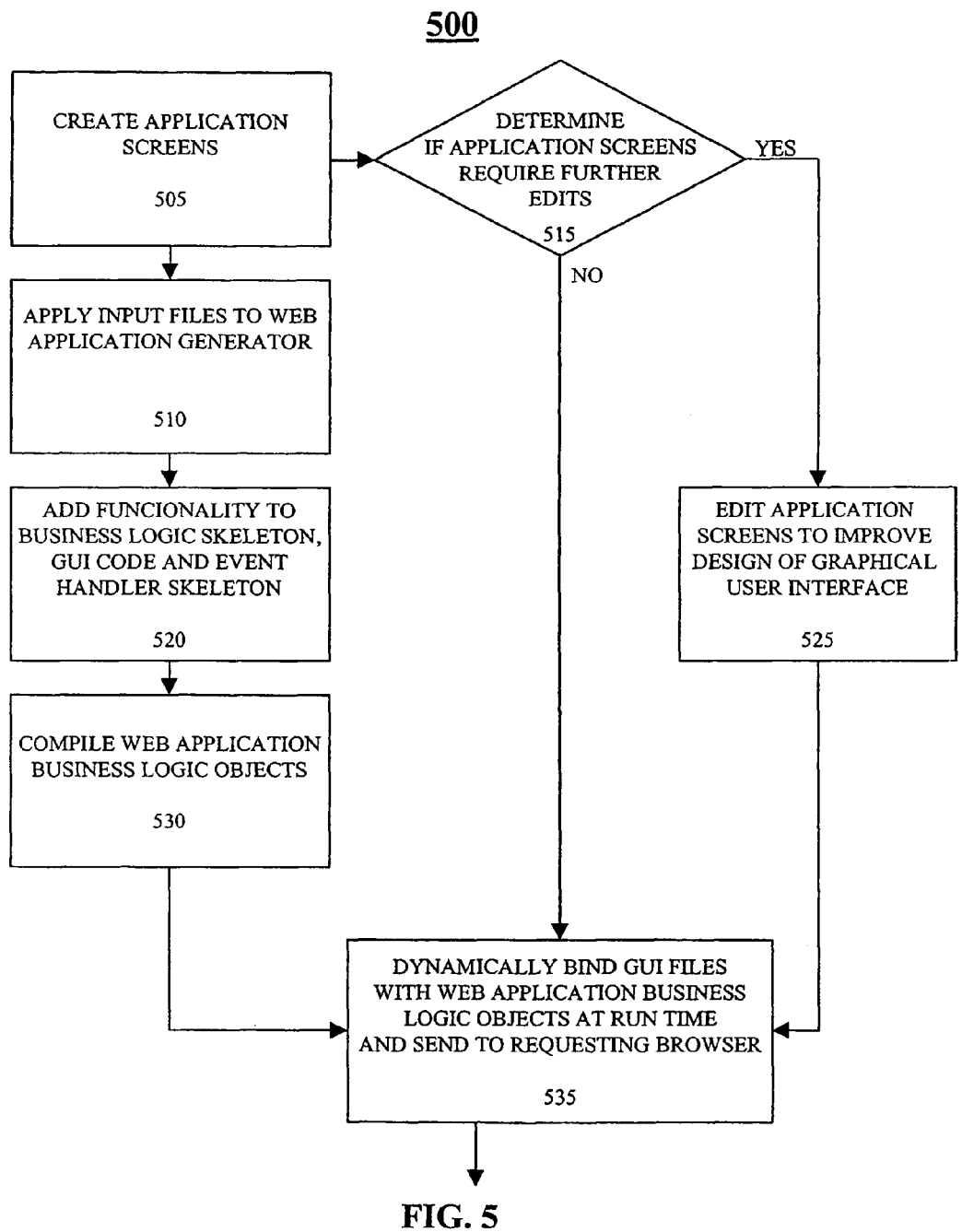
FIG. 5 is a flow diagram 500 illustrating an embodiment of the process by which a web application is generated and sent to a web browser.
Figure 6:
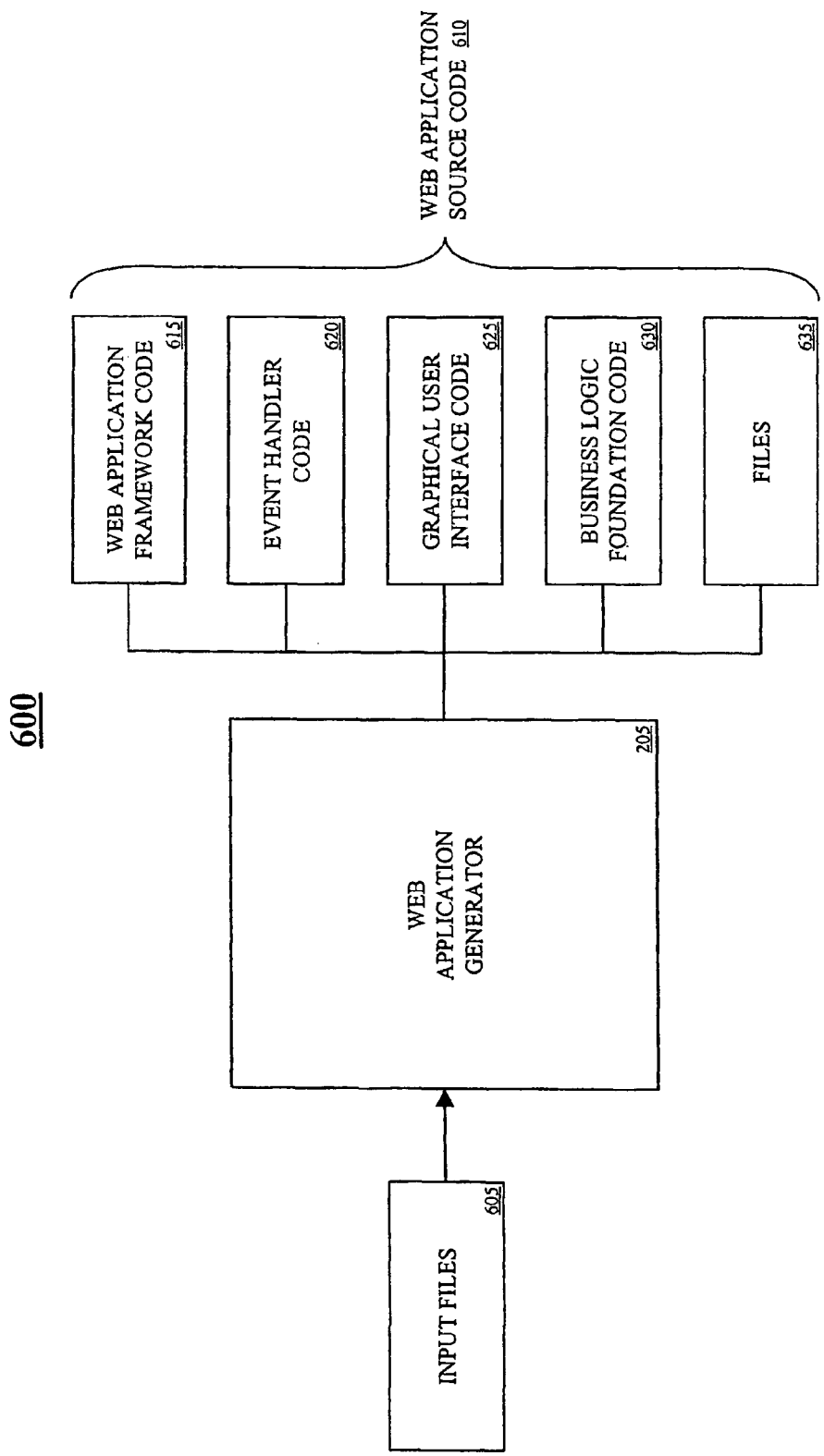
FIG. 6 is a flow diagram 600 illustrating an embodiment of the process by which input files are applied to the web application generator and web application source code is created.
Figure 7:
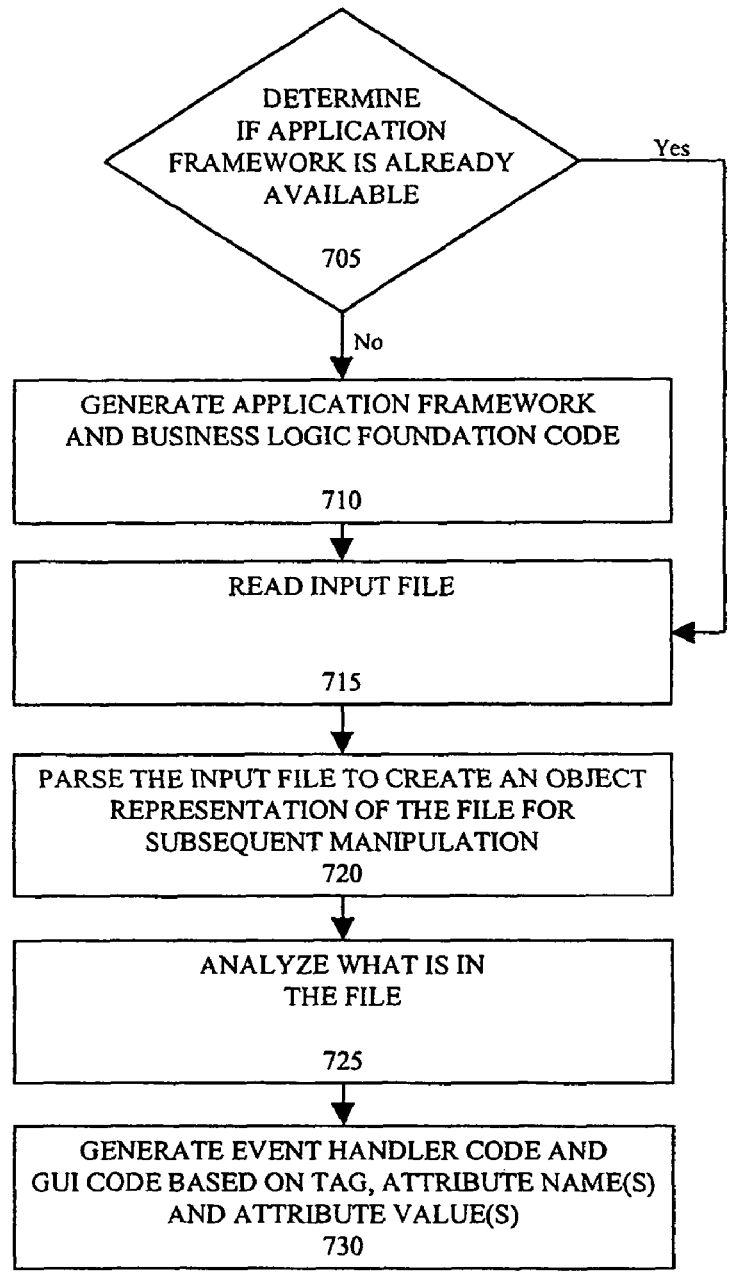
FIG. 7 is a flow diagram 700 illustrating an embodiment of the process of applying input files to the web application generator.

The web application development and deployment involves a series of steps illustrated in FIGS. 5-7. As shown in FIG. 5, the first step comprises one or multiple graphic designers and/or business analysts 210 creating web application screens using visual editors or a text editor (step 505). In one embodiment, the application screens are written in HTML format using a visual HTML editor, such as Microsoft FrontPage, Adobe GoLive or Netscape Composer.

Once the graphic designer(s) 210 are satisfied that the application screens contain all the necessary visual input and output elements for the web application, all the application screens are applied to the web application generator as input files (step 510). In one embodiment, the input files are in HTML format.

In other embodiments, the web application screens may be in other formats, such as XML, XSL, WML and cHTML, depending on the types of devices targeted for the web application. All such languages are created using XML, and as a result, their syntax is exactly the same. For example, a simple HTML file is as follows:

```
<html>
<body>
<p> Hello World. </p>
<body>
</html>
```

The same file in WML format is as follows:

```
<wml>
<card>
<p> Hello World. </p>
</card>
```

Thus, both examples show essentially the same tags but in different languages.

As illustrated in FIG. 6, the web application generator 205 reads the set of web application screens as the input 605 and generates web application source code 610 as the output. This web application source code output 610 comprises web application framework code 615, event handler code 620, graphical user interface (GUI) code 625, business logic foundation code 630 and additional files 635. The web application generator 205 generates the same application framework code 615, event handler code 620, graphical user interface code 625, business logic foundation code 630 and additional files 635 regardless of the language format for the input files, because the input tags are interpreted in the same fashion for the different languages (e.g., XML, HTML, etc.).

FIG. 7 illustrates how the input files are applied to the web application generator. As shown in FIG. 7, web application generator 205 first determines if application framework code 615 is already available by searching for its existence in the application directory (step 705). Application framework code is specific for a particular web application. Once it is generated for the web application, it is stored in the application directory of the application web server 100. However, a separate web application requires a separate application framework code. Further, the same application provided by graphic designers/business analysts in multiple input formats (e.g., HTML and WML) uses the same application framework code and does not require multiple generations of application framework code.

Web application generator 205 also determines if business logic foundation code 630 was previously generated for the web application. Business logic foundation code is also specific for a particular web application. In one embodiment, business logic foundation code 630 is available if application framework code 615 is available. However, in another embodiment, application framework code 615 may be available while business logic foundation code 630 is not. In this case, business logic foundation code 630 may be generated by the web application generator 205.

If application framework code 615 is not found in the application directory, web application generator 205 generates application framework code 615 and business logic foundation code 630 (step 710). Application framework code 615 is generated independent of the content of the input files 605, and provides the framework for the entire web application. Business logic foundation code 630 is also generated independent of the input files 605, whereas event handler code 620 and GUI code 625 depend on the content of the input files 605. If application framework code 615 and business logic foundation code 630 were created earlier for this web application, step 710 is skipped.

Next, web application generator 205 reads each input file 605 (step 715), and parses the input file to create an object representation of the file for subsequent manipulation (step 720). After parsing the input file, web application generator 205 analyzes what is in the parsed file and, in one embodiment, attempts to identify certain input tags (step 725). Such tags include, but are not limited to, the following:

| | | |
|---|---|---|
| comment tag | password tag | LMShowView tag |
| include tag | ext area tag | JLMShowParentView tag |
| variable tag | select tag | repeat tag |
| output tag | checkbox tag | if else tag |
| frame tag | radio tag | |
| anchor tag | hidden tag | |
| form tag | JLMClick tag | |
| text tag | JLVDefaultClick tag | |

After identifying the input tag, web application generator 205 searches for specific attributes within the input tag, based on the input tag type. In one embodiment, certain tags have a single attribute, while other tags have multiple attributes. After identifying each attribute within the tag, web application generator 205 identifies an attribute value associated with the attribute name. Ultimately, based on the input tag, attribute name(s) and associated attribute value(s), web application generator 205 relies on a particular "rule" (or fixed formula) within web application server memory 325 to generate event handler code 620 and GUI code 625 (step 730). Thus, the input tag, attribute name and attribute value determine the "rule" that web application generator 205 relies on to generate event handler code 620 and GUI code 625.

For example, in one embodiment, one tag of an Input file in HTML format is "<input type=submit name=JLMClick value=Add>". Web application generator 205 first identifies the tag as an "input" tag, next identifies the attribute names as "name" and "value", and further identifies the associated attribute values as "JMLClick" and "Add". Based on the input tag, attribute names and associated attribute values, web application generator 205 relies on a particular rule in web application server memory 325 to generate the following event handler method: "public void add (App app) throws Exception", as well as a GUI code in the form of a source file such as "indexClickjava." If one of the attribute values was something other than JLMClick, then web application generator 205 would have relied on a separate rule in web application server memory 325 to generate event handler code 620 and GUI code 625.

Alternatively, in another embodiment, one tag of an input file in WML format is:
  <go href="./?JLMClick=Add"/>

Web application generator 205 identifies the input tag ("go"), attribute name ("href") and associated attribute value ("./?JLMClick=Add"/"). Since this tag is the same input tag as the first example except in a different format (WML vs. HTML), web application generator 205 relies on the same rule as the first example to generate the same event handler method and GUI code.

In one embodiment, web application source code output 610 is generated as a corresponding Java class. However, in other embodiments, web application source code output 610 may be structured for any object-oriented programming language, such as JavaScript, C#, C++ or SmallTalk.

As illustrated in FIG. 6, web application source code output 610 comprises web application framework code 615, event handler code 620, graphical user interface (GUI) code 625, business logic foundation code 630 and additional files 635. In one embodiment, each portion of web application source code output 610 is generated in Java as follows based on HTML input files. In other embodiments, different input format languages and different programming languages may be used.

First, web application framework code 615 comprises an application object and a complete Java servlet web application framework object. In other embodiments, the servlet can be based on different object-oriented programming languages.

The application object is passed to all event handlers (click methods). Also, the application object allows the event handlers (click methods) to access: (1) the HTTP request object received from the web browser (in the form of a URL address), (2) the HTTP response object sent back to the requesting web browser, (3) application business logic, (4) the application database connection, and (5) application structured query language (SQL) statements and application properties. Further, the application object allows event handlers (click methods) to set the dynamic values for <input> and <output> tags within an HTML screen, and allows event handlers (click methods) to show an HTML screen. Finally, the application object is immediately ready for use within the web application and requires no additions or revisions by web developers.

The Java servlet web application framework object receives requests from web browsers, dispatches those requests with the application object to appropriate event handlers (click methods), receives responses back from event handlers (click methods) via the application object and transmit responses back to requesting web browsers. The Java servlet web application framework object also reads the application properties file and makes all application properties available in the application object, and reads the application SQL file and makes all application SQL statements available in the application object. Further, the Java servlet web application framework object manages database connections for the application by establishing, sharing and terminating database connections, regardless of database types and application specific contents. Database connections are network connections from the web application server to the database specified by the web developers, such as an Oracle 8i database, Microsoft SQL server, etc. Finally, the Java servlet web application framework object is immediately ready for use within the web application and requires no additions or revisions by web developers.

Event handler code 620 comprises a skeleton or framework made up of an event handler (click method) object that accepts requests from HTML <input> tags with JLMClick name and submit type attributes in the HTML files. As discussed above in connection with FIG. 7, for each JLMClick submit <input> tag identified by web ion generator 205, a corresponding event handler (click method) is generated to the request. Upon receipt of event handler code 620 as an output from web ion generator 205, web developers 215 simply need to write appropriate source code into the event handler code skeleton to drive the application business logic in response to user interactions.

Graphical user interface code 625 is a programming proxy to input files 605. Input files 605 contain output parameters that must be set up by web developers 215 as a result of the function, and web developers 215 need a way to set those parameters in an object-oriented programming environment. Graphical user interface code 625 provides this in the form of a programming proxy or view. Later, during the deployment phase, application framework code 615 binds the output parameters to the interpreted or compiled input files, developer by graphic designers/business analysts 210.

Next, business logic foundation code 630 is the foundation for the application business logic object that is fully prepared by web developers 215 and accessible to all event handlers (click methods) by means of the application object. Upon receipt of business logic foundation code 630 as an output from web application generator 205, web developers 215 assemble reusable object-oriented business components and write all the core business logic that drives the web application, and particularly its function.

Web developers 215 may ignore business logic foundation code 630, and prepare the application business logic objects from "scratch." However, business logic foundation code 630 is provided to assist web developers 215 with a foundation or skeleton, but may be completely ignored by web developers 215. In fact, in another embodiment, no business logic foundation code is generated whatsoever as part of the output from the web application generator.

Finally, additional files 635 are generated by web application generator 205, allowing information to be initially set by web developers 215, but changeable by application administrators without requiring a recompilation of the application source code; For example, in one embodiment, an application runtime properties file is generated where web developers set all the application runtime properties which are made available to event handlers (click methods) by the application servlet framework. This application runtime properties file may be changed by application administrators during deployment by simply editing the file rather than editing the application source code and re-compiling the application source code. Also, an application SQL statements file may also be generated where web developers set all the application SQL statements which are made available to event handlers (click methods) by the application servlet framework. This application SQL statements file may be changed by application administrators during deployment on different databases by simply editing the file rather than editing the application source code and re-compiling the application source code.

Returning to FIG. 5, web developers 215 prepare web application source code in an object-oriented programming language based on event hander code 620, graphical user interface code 625 and business logic foundation code 630 (step 520). As described in detail above in connection with FIG. 6, the web developers 215: (1) write appropriate source code into event handler code 620 to drive the application business logic in response to user interactions, (2) refer to graphical user interface code 625 as a programming proxy, and (3) optionally rely on business logic foundation code 630 to assemble reusable object-oriented business components and write all the core business logic that drives the web application.

As web developers 215 are busy adding functionality to event handler code 620 and business logic foundation code 630, graphic designers/business analysts 210 determine if the web application screens require further edits (step 515). If the graphic designers/business analysts 210 elect to edit the web application screens, they can work in parallel (with the web developers 215) on the application screens to alter and/or improve the design of the graphical user interface (step 525). Such design changes takes place immediately without requiring web application generator 205 to regenerate web application source code 610 or web developers 215 to modify and recompile existing source code. However, at runtime, application framework code 615 detects any change to the web application screens, since such screens were initially inputs 605 to web application generator 205, and if changes are detected, the input files are either re-compiled or re-interpreted automatically. In one embodiment, the graphic design is greatly simplified because the HTML files contain pure HTML tags without any confusing script. Thus, the HTML files can be easily manipulated by graphic designers/business analysts 210 using any visual HTML editor. Also, no HTML tag is embedded in the programming source code and therefore, the user interface is 100% customizable just by editing the HTML files without having to edit the source code.

Also, web developers 215 benefit from the separation of the HTML tags from the programming code because the web developers 215 can use any object-oriented programming language such as Java to develop the web application rather than using a scripting language that requires line-by-line interpretation. An object-oriented programming language allows the web application to achieve better scalability in terms of providing additional features and complexity in the complete life cycle of the web application. Also, the use of a compiled programming language (as opposed to an interpreted programming language) allows a better runtime performance for the web application than a web application developed with an interpreted scripting language.

When web developers 215 are finished preparing web application source code 610, web application source code 610 is either compiled or interpreted by the programming language compiler/interpreter in which the code is written (step 530). In one embodiment, the web application source code is written in the Java programming language and compiled by a Java compiler. In other embodiments, the web application source code may be written and compiled or interpreted in JavaScript, $C^{\#}$, $C^{++}$, SmallTalk or other programming languages.

At some point, graphic designers 210 complete any design changes to the graphical user interface and web application source code 610 prepared by web developers 215 is either compiled or interpreted. Thus, the development phase is complete and the web application is ready for deployment.

Web Application Deployment

Based on a request for the web application from a web browser; the web application server 100 dynamically binds graphical user interface (GUI) files with web application business logic objects at runtime in order to provide the web application to the web browser (step 535). As described above, if the web application screens were modified after initially being applied to web application generator 205, they are automatically re-compiled or re-interpreted by application framework code 615. In one embodiment, HTML, WML or cHTML input files can either be interpreted or compiled by the application framework at runtime. Compilation of the input files (instead of interpreting them) increases application framework performance as well as complexity. Further, the input files may be compiled at runtime into Java Document Object Model (DOM) objects and the resulting objects are stored in a cache in the computer memory for performance purposes. In another embodiment, XML and/or XSL files can also either be interpreted or compiled by the application framework at runtime. For example, at runtime, the application framework compiles the XML files into DOM objects, transforms the DOM objects into the appropriate DOM objects based on the XSL files, caches the transformed objects and binds the data from the business logic components to produce the final screen viewed by the application users.

Cost Calculator Exa1mple

In an exemplary embodiment, a cost calculator web application fc developed as follows. First, a graphic designer/business analyst creates a cost calculator screen using a visual HTML editor or a text editor to produce the following HTML tags within an HTML file:

```
1.   <!-- File: CostCalculator.html -->
2.   <html>
3.   <head><title>Cost Calculator</title></head>
4.   <body>
5.   <h3>Cost Calculator</h3>
6.   <form method=post action=./>
7.   Item Code: <input type=text name=item_code<br>
8.   Item Quantity: <input type=text name-item_qty><br>
9.   Unit Price: <output name=unit_price></output><br>
10.  Total: <output name=total_cost></output><br>
11.  <input type=submit name=JLMClick value=Calculate>
12.  </form>
13.  </body>
14.  </html>
```

Figure 8:
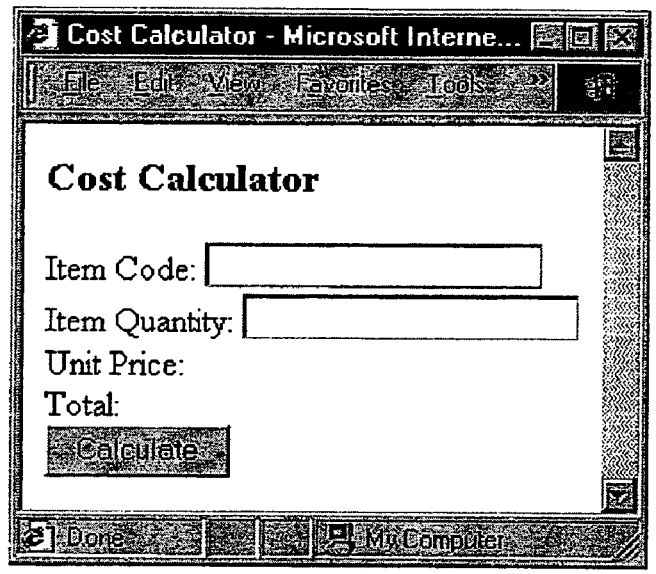
FIG. 8 is an embodiment of web page 800 generated by HTML files.

Line 1 is an HTML comment showing the name of the HTML file. Lines 2-14 contain the HTML tags for the HTML document. Line 3 contains the "head" part of the HTML document, that sets the title of the document to "Cost Calculator." This title appears in the title bar of most web browsers receiving this web application. Lines 4-13 contain the "body" part of the HTML document. Line 5 shows a "Cost Calculator" heading at the top of the document. Lines 6-12 contain the "form" part of the HTML document, a lowing users to send information to the web application. For example, line 7 produces a text box for a user to enter a product item code. Line 8 produces another text box for a user to enter the product item quantity. Lines 9 and 10 show the unit price and total cost for the product item. The <output> tag in lines 9-10 is processed by the web application server on the server-side while all the other HTML tags are processed by the web browser on the user-side. Finally, line 11 shows a "calculate" button for the user to click in order to send the item code and quantity to the web application server for computation of the total cost. The initial cost calculator screen 800 is illustrated in FIG. 8.

After the graphic designer/business analyst is satisfied that the HTML screen contains all the necessary input and output elements for the cost calculator web application, the HTML files are sent through the web application generator in order to create the web application source code. The web application source code created comprises Java files that make up the application framework code, event handler code, graphical interface code, business logic foundation code and additional application file. For example, the application framework code comprises an application object (App.java) and a complete Java servlet web application framework object (AppServlet.java). Both the application object and the complete Java servlet web application framework object are described in detail above in connection with FIG. 6, and are ready for use within the web application and require no additions or revisions by web developers. The event handler code and graphical user interface code, also described in detail in connection with FIG. 6, comprise one object file (CostCalulator.java). This object file requires web developers to write additional source code to drive the application business logic in response to user interactions. Next, the business logic foundation code, described in detail in connection with FIG. 6, comprises a foundation file (AppModel.java) for the application business logic object that is accessible to all event handlers (click methods) by means of the application object file. Web developers may ignore this file, or use it to assemble reusable object-oriented business components and write all the core business logic that drives the web application. Finally, two additional files (App.properties, App.sql) are created that allow the web developers to set the application runtime properties and application SQL statements for the web application. After the development phase, application administrators may change either the application runtime properties of the application SQL statements by simply editing either file rather than editing the application source code and re-compiling the application source code.

A portion of the web application source code created by the web application generator for the cost calculator is shown as follows:

```
// File: AppModel.java
// original file generated by WebAppGen
public class AppModel {
    // application business logic variables and methods here
    public void showHome(App app) throws Exception {
        // application home page code here
        app.showView("CostCalculator.htmr);
    }
    AppModel(AppServlet as) throws Exception {
        //application initialization here
    }
}
// File: CostCalculator.java
// original file generated by WebAppGen
public class CostCalculator {
    public static void calculate(App app) throws Exception {
        // click method code here
    app.showView("CostCalculator.html");
    }
}
// File: AppModel.java
// added getUnitPrice business logic method
public class AppModel {
    // application business logic variables and methods here
    public int getUnitPrice(String item_code) {
```

```
        // this is an example business logic method
        if (item_code.equals("20000412")) return 20;
        else return 50;
    }
    public void showHome(App app) throws Exception {
        // application home page code here
        app.showView("CostCalculator.html");
    }
    AppModel(AppServlet as) throws Exception {
        // application initialization here
    }
```

For example, Line 11 of the CostCalculator.html file ("<input type=submit name=JLMClick value=Calculate) is an HTML tag that causes the web application generator to generate a corresponding "void calculate (App app)" event handler method based on the tag type, attribute name and attribute value. When a user clicks one the "Calculate" button within a web browser, the request to the web application is dispatched to the corresponding "calculate" method by the web application framework.

Next, the web developers add functionality to the AppModel.java and CostCalculator.java files created by the web application generator. Also, the web developers can set parameters, can set parameters, as shown below in the web application source code, to set the unit price and total cost values in the application object:

```
// File: CostCalculator.java
// added code to get the unit price
// and compute the total cost
// in the calculate click method
public class CostCalculator {
    public static void calculate(App app) throws Exception {
        // click method code here
        String item code = app.getParameter("item_code");
        int unit-price = app. model. getUnitPrice(item_code);
        int item_gty = Integer.parseInt(app.getParameter("item_qty"));
        int total-cost = unit-Price * item_qty;
        app. setParameter("unit-price",String.valueOf(unit_price));
        app.setParameter("total cost",String.valueOf(total_cost));
        app.showView("CostCalculator. html");
    }
}
```

Later at runtime, the application uses these values to replace the <output name=unit price></output> and <output name=total cost></output> HTML tags in the CostCalculator.html file before sending as a response to the web browser.

The graphic designers may work in parallel while the web developers add functionality to the CostCalculator.html file to improve the design of the graphical user interface. For example, the graphic designers can modify the original CostCalculator.html file as follows:

```
1.  <!-- File: CostCalculator.html -->
2.  <!-- modified to make the user interface look better -->
3.  <html>
4.  <head><title>Cost Cal cu lator</title></head>
5.  <body>
6.  <center>
7.  <h3>Cost Calculator</h3>
8.  <form method=post action=./>
9.  <table>
10. <tr><td>ltem Code:</td>
11. <td><input type=text name=item_code></td></tr>
12. <tr><td>ltem Quantity:</td>
13. <td><input type=text name=item_qty></td></tr>
14. <tr><td>Unit Price</td>
15. <td><output name=unit price></output></td></tr>
16. <tr><td>Total</td>
17. <td><output name=total cost></output></td></tr>
18. </table>
19. <input type=submit name=JLMClick value=Calculate>
20. </form>
21. </center>
22. </body>
23. </html>
```

Figure 9:
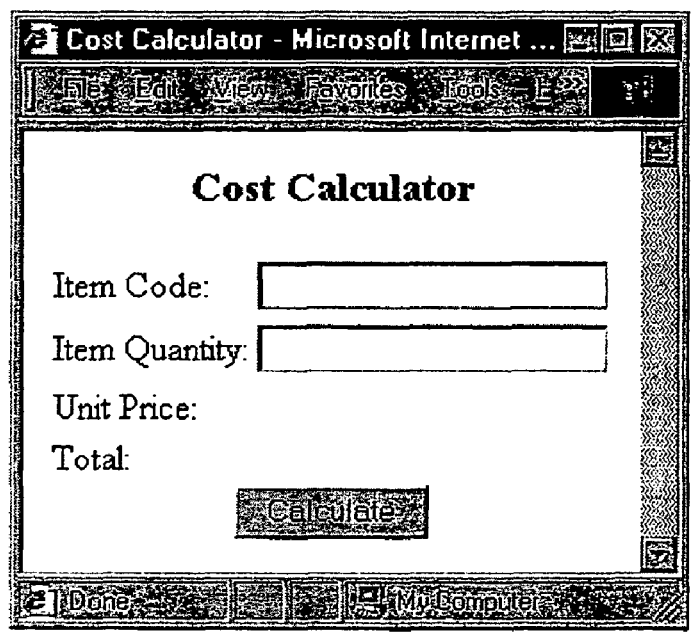
FIG. 9 is an embodiment of web page 900 generated by HTML files.

Lines 6 and 21 were added to center the user interface within the browser. Lines 9 and 18 were added to arrange the item code, item quantity, unit price and total names and values in table format. Further, in lines 10-17, the <tr> and </tr> tags specify a row of the table while the <td> and </td> tags specify a cell of the table. The modified cost calculator screen 900 is illustrated in FIG. 9.

After the modifications are added to the CostCalculator.html file, the effect takes place immediately without requiring the web application generator to re-generate the web application source code or the web developers to modify and recompile the existing source code. At runtime, the Cost Calculator.html files will be re-compiled automatically by the application framework.

Upon completion by the graphic designers of the HTML files and compilation of the web application source code prepared by the web developers, the web application is available for use.

Figure 10:
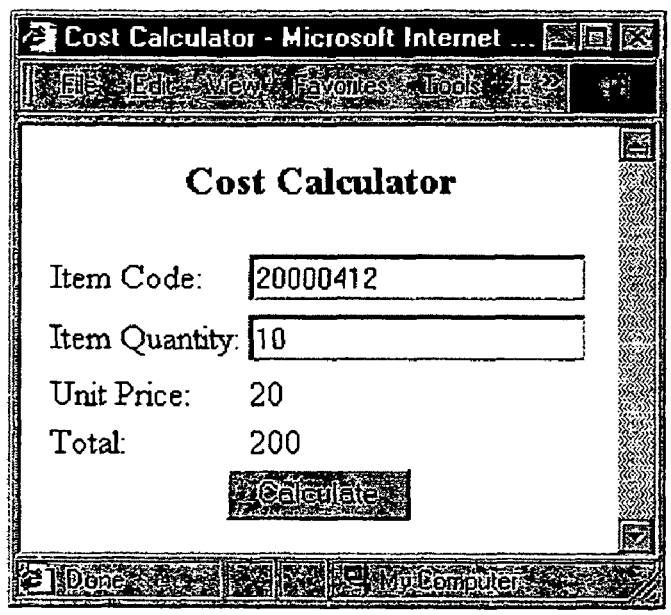
FIG. 10 is an embodiment of web page 1000 generated by HTML files and web application source code.
Figure 5:
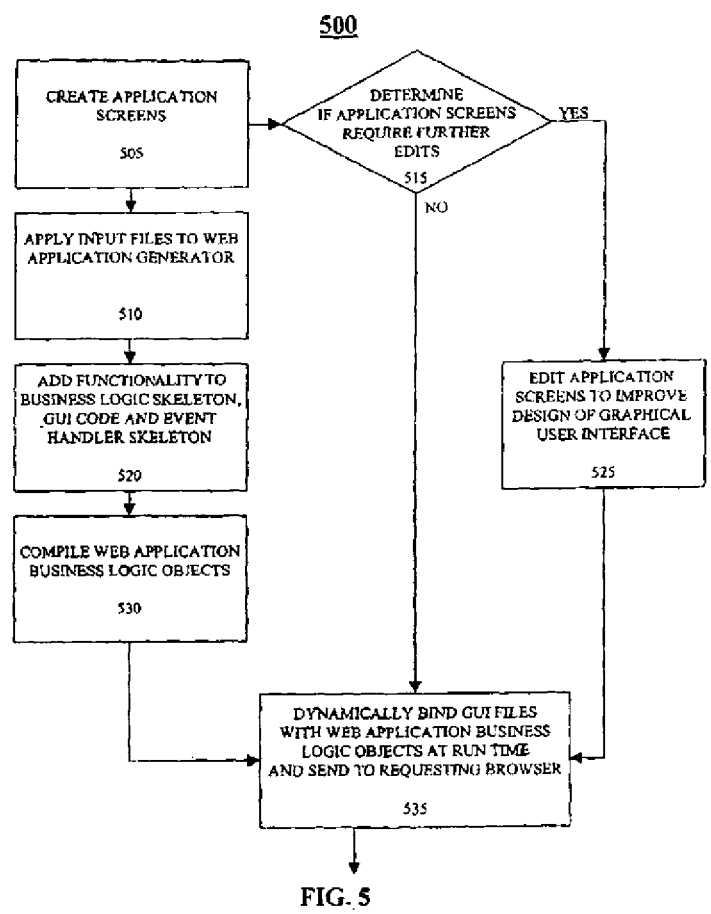

As shown in FIG. 10, the user inputs an item code and item quantity through a web browser. The web application takes those inputs and provides a unit price and total as outputs.

Although illustrative embodiments have been described herein in detail, it should be noted and understood that the descriptions have been provided for purposes of illustration only and that other variations both in form and detail can be made thereupon without departing from the spirit and scope of the method, system and apparatus for providing a web application generator. The terms and expressions have been used as terms of description and not terms of limitation. There is no limitation to use the terms or expressions to exclude any equivalents of features shown and described or portions thereof, and the web application generator should be defined with the claims that follow.

What is claimed:

1. A method comprising:
generating source code for a web application, the generating including:
parsing an input file;
identifying an input tag responsive to the parsing;
identifying an attribute corresponding to the identified input tag;
identifying a value corresponding to the identified attribute; and
using the identified input tag, the identified attribute, and the identified value to identify a rule; and
using the identified rule, the identified input tag, the identified attribute~ and the identified value to generate an event handler code.

2. The method of claim 1, wherein the source code comprises graphical user interface (GUI) code, application framework code, the event handler code, and application business logic code.

3. The method of claim 2, wherein the application framework code is configured to provide instruction to an operating system of a web application server.

4. The method of claim 2, further comprising providing a framework for finalizing the source code using an event handler skeleton, business logic code, and GUI code.

5. The method of claim 1, wherein the event handler code comprises an event handler object that is configured to accept a request from an HTML input tag with JLMClick name and submit type attributes.

6. The method of claim 1, further comprising providing the input file to a web application generator that is configured to perform the parsing, identifying, and using.

7. The method of claim 6, further comprising employing the web application generator to read the input file and create an object representation of the input file for subsequent manipulation responsive to the reading.

8. The method of claim 6, further comprising employing the web application generator to analyze the content of the input file and select the input tag from a prescribed group of input tags responsive to the analysis.

9. The method of claim 8, wherein the prescribed group of input tags comprises a comment tag, a password tag, an LMShowView tag, an include tag, an ext area tag, a JLMShowParentView tag, a variable tag, a select tag, a repeat tag, an output tag, a checkbox tag, an if else tag, a frame tag, a radio tag, an anchor tag, a hidden tag, a form tag, a JLMClick tag, a text tag, and a JLVDefaultClick tag.

10. The method of claim 8, further comprising, after selecting the input tag, employing the web application generator to search for the attribute within the input tag.

11. An article of manufacture including a non-transitory computer-readable memory having instructions stored thereon that, in response to execution by a computing device, cause the computing device to perform operations comprising:

generating source code for a web application, the generating including:
parsing an input file;
identifying an input tag responsive to the parsing;
identifying an attribute corresponding to the identified input tag;
identifying a value corresponding to the identified attribute; and
using the identified input tag, the identified attribute, and the identified value to identify a rule; and
using the identified rule, the identified input tag, the identified attribute, and the identified value to generate an event handler code.

12. The article of manufacture of claim 11, wherein the source code comprises graphical user interface (GUI) code, application framework code, the event handler cod, and application business logic code.

13. The article of manufacture of claim 12, wherein the application framework code is configured to provide instruction to an operating system of a web application server.

14. The article of manufacture of claim 12, wherein the operations further comprise providing a framework for finalizing the source code using an event handler skeleton, business logic code and GUI code.

15. The article of manufacture of claim 11, wherein the event handler code comprises an event handler object that is configured to accept a request from an HTML input tag with JLMClick name and submit type attributes.

16. The article of manufacture of claim 11, wherein the operations further comprise providing the input file to a web application generator that is configured to perform the parsing, the identify, and the using.

17. The article of manufacture of claim 16, wherein the operations further comprise employing the web application generator to read the input file and create an object representation of the input file for subsequent manipulation responsive to the reading.

18. The article of manufacture of claim 11, wherein the operations further comprise employing the web application generator to analyze the content of the input file and select the input tag from a prescribed group of input tags responsive to the analysis.

19. The article of manufacture of claim 18, wherein the prescribed group of input tags comprises a comment tag, a password tag, an LMShowView tag, an include tag, an ext area tag, a JLMShowParentView tag, a variable tag, a select tag, a repeat tag, an output tag, a checkbox tag, an if else tag, a frame tag, a radio tag, an anchor tag, a hidden tag, a form tag, a JLMClick tag, a text tag, and a JLVDefaultClick tag.

20. The article of manufacture of claim 18, wherein the operations further comprise after selecting the input tag, employing the web application generator to search for the attribute within the input tag.

21. An apparatus, comprising:
means for generating source code for a web application;
means for parsing an input file;
means for identifying an input tag responsive to the parsing;
means for identifying an attribute corresponding to the identified input tag;
means for identifying a value corresponding to the identified attribute; and
means for using the identified input tag, the identified attribute, and the identified value to identify a rule; and
means for generating an event handler code using the identified rule, the identified input tag, the identified attribute, and the identified value.

22. The apparatus of claim 21, wherein the source code comprises graphical user interface (GUI) code, application framework code, the event handler code, and application business logic code.

23. The apparatus of claim 22, wherein the application framework code is configured to provide instruction to an operating system of a web application server.

24. The apparatus of claim 22, further comprising means for providing a framework for finalizing the source code using an event handler skeleton, business logic code, and GUI code.

25. The apparatus of claim 21, wherein the event handler code comprises an event handler object that is configured to accept an HTML input tag with JLMClick name and submit type attributes.

26. The apparatus of claim 21, further comprising means for providing the input file to a web application generator.

27. The apparatus of claim 26, further comprising means for employing the web application generator to create an object representation of the input file for subsequent manipulation.

28. The apparatus of claim 27, further comprising means for employing the web application generator to select the input tag from a prescribed group of input tags.

29. The apparatus of claim 28, wherein the prescribed group of input tags comprises a comment tag, a password tag, an LMShowView tag, an include tag, an ext area tag, a JLMShowParentView tag, a variable tag, a select tag, a repeat tag, an output tag, a checkbox tag, an if else tag, a frame tag, a radio tag, an anchor tag, a hidden tag, a form tag, a JLMClick tag, a text tag, and a JLVDefaultClick tag.

30. The apparatus of claim 28, further comprising means for employing the web application generator to search for the attribute within the input tag.

* * * * *

UNITED STATES PATENT AND TRADEMARK OFFICE
CERTIFICATE OF CORRECTION

| | |
|---|---|
| PATENT NO. | : 8,402,427 B2 |
| APPLICATION NO. | : 11/512978 |
| DATED | : August 29, 2006 |
| INVENTOR(S) | : Chiang |

It is certified that error appears in the above-identified patent and that said Letters Patent is hereby corrected as shown below:

In the Drawings

In Fig. 5, Sheet 5 of 10, in Box "520", in Line 1, delete "FUNCIONALITY" and insert -- FUNCTIONALITY --, therefor, as shown on the attached page 2 of 2.

In the Specifications

In Column 2, Line 5, delete "Preprocesor" and insert -- Preprocessor --, therefor.

In Column 3, Line 4, delete "oh" and insert -- on --, therefor.

In Column 3, Line 67, delete "files:" and insert -- files; --, therefor.

In Column 7, Line 49, delete "JLVDefaultClick tag" and insert -- JLVDefaultClick tag --, therefor.

In Column 8, Line 10, delete ""indexClickjava."" and insert -- "indexClick.java." --, therefor.

In Column 11, Line 29, delete "Exa1mple" and insert -- Example --, therefor.

In the Claims

In Column 14, Line 57, in Claim 1, delete "attribute~" and insert -- attribute, --, therefor.

In Column 15, Line 43, in Claim 11, delete "handier" and insert -- handler --, therefor.

In Column 15, Line 46, in Claim 12, delete "cod," and insert -- code, --, therefor.

In Column 16, Line 14, in Claim 20, delete "comprise" and insert -- comprise, --, therefor.

Signed and Sealed this
Twentieth Day of May, 2014

Michelle K. Lee
*Deputy Director of the United States Patent and Trademark Office*